July 23, 1940.  E. F. STOVER  2,208,609
ELECTRIC FLOW METER
Filed May 22, 1937  3 Sheets-Sheet 1

Inventor:
Emory Frank Stover
By F. DeWitt Goodwin
Attorney

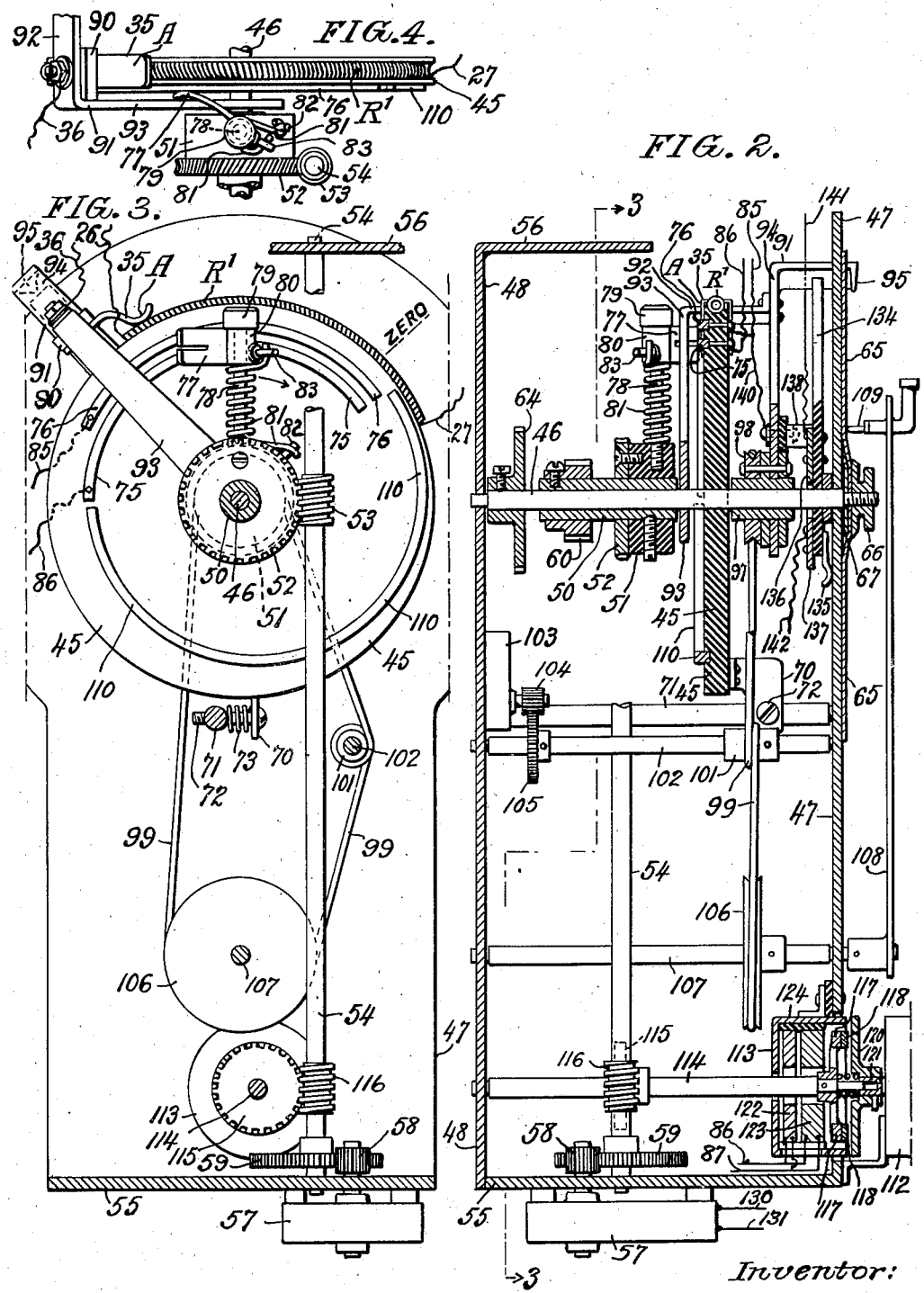

July 23, 1940.  E. F. STOVER  2,208,609
ELECTRIC FLOW METER
Filed May 22, 1937    3 Sheets-Sheet 3
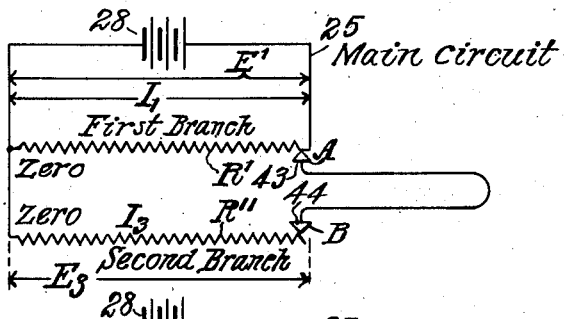
FIG. 5.
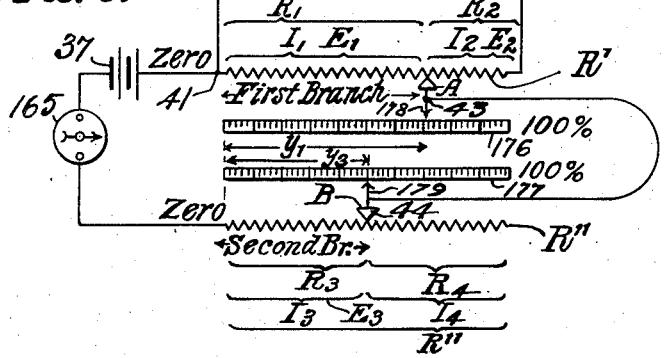
FIG. 6.
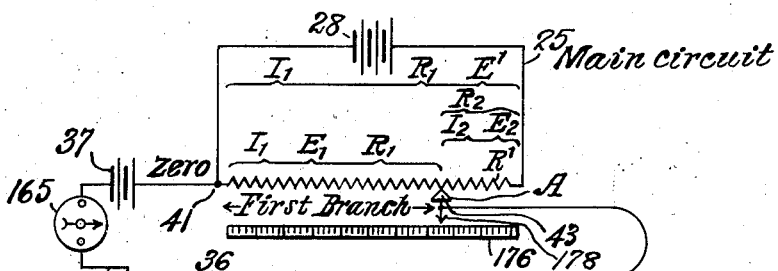
FIG. 7.
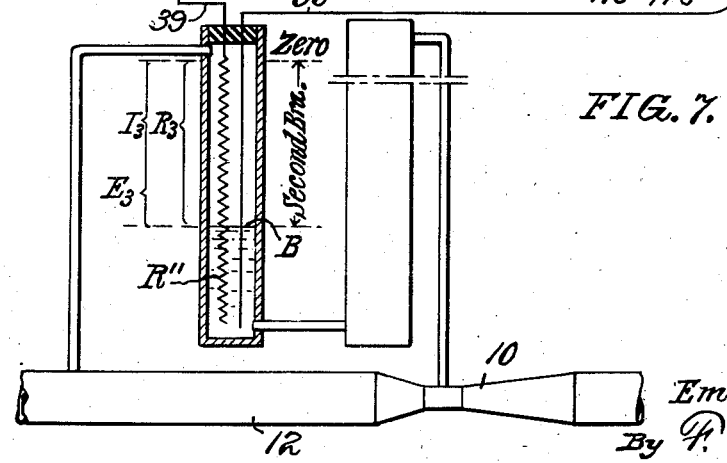
Inventor:
Emory Frank Stover
By F. DeWitt Goodwin
Attorney Patented July 23, 1940

2,208,609

UNITED STATES PATENT OFFICE 2,208,609

ELECTRIC FLOW METER

Emory Frank Stover, Wynnewood, Pa.

Application May 22, 1937, Serial No. 144,156

21 Claims. (Cl. 73—205)

My invention relates to a measuring system and apparatus for measuring and indicating physical and other quantities to be measured, and particularly to meters for measuring the flow of fluid in conduits.

The object of my invention is to provide a system for controlling the current in an electrical circuit, whereby the current in a branch of the circuit will be caused to vary directly as the resistance included in said branch.

A further object is to provide a system of obtaining a square law by varying the resistance in a first branch circuit until it is proportional to the square root of the resistance included in a second branch circuit.

A further object is to provide novel apparatus which is actuated by a condition, or quantity, which varies directly as the quantity to be measured, and control the resistors included in branching electrical circuits for obtaining the square root of said quantity to be measured.

A further object is to provide a meter for measuring the flow of fluid through a conduit, including a primary differential producing device, giving a square root relation between the rate of flow through the conduit and the differential pressure, and employ in the meter the use of the principle of the flow of currents in branching electrical circuits for extracting the square root of said differential pressure.

These together with various other novel features of construction and arrangement of the parts, which will be more fully hereinafter described and claimed, constitute my invention.

Referring to the accompanying drawings:

Fig. 2 is a central vertical sectional view of the meter shown in Fig. 1.

Fig. 3 is a vertical section on line 3—3 Fig. 2.

Fig. 4 is a partial plan view of Fig. 3.

Figs. 5 and 6 are diagrams illustrating the electrical circuits throughout the various steps of my novel system.

Fig. 7 is a diagram illustrating the electrical circuits including a Venturi tube and a manometer.

In the drawings in which like reference characters refer to like parts, Figs. 1 to 4 illustrate one application of my invention employing the novel system for controlling the resistance, and thereby controlling the current flowing in the electrical circuits.

Figure 1:
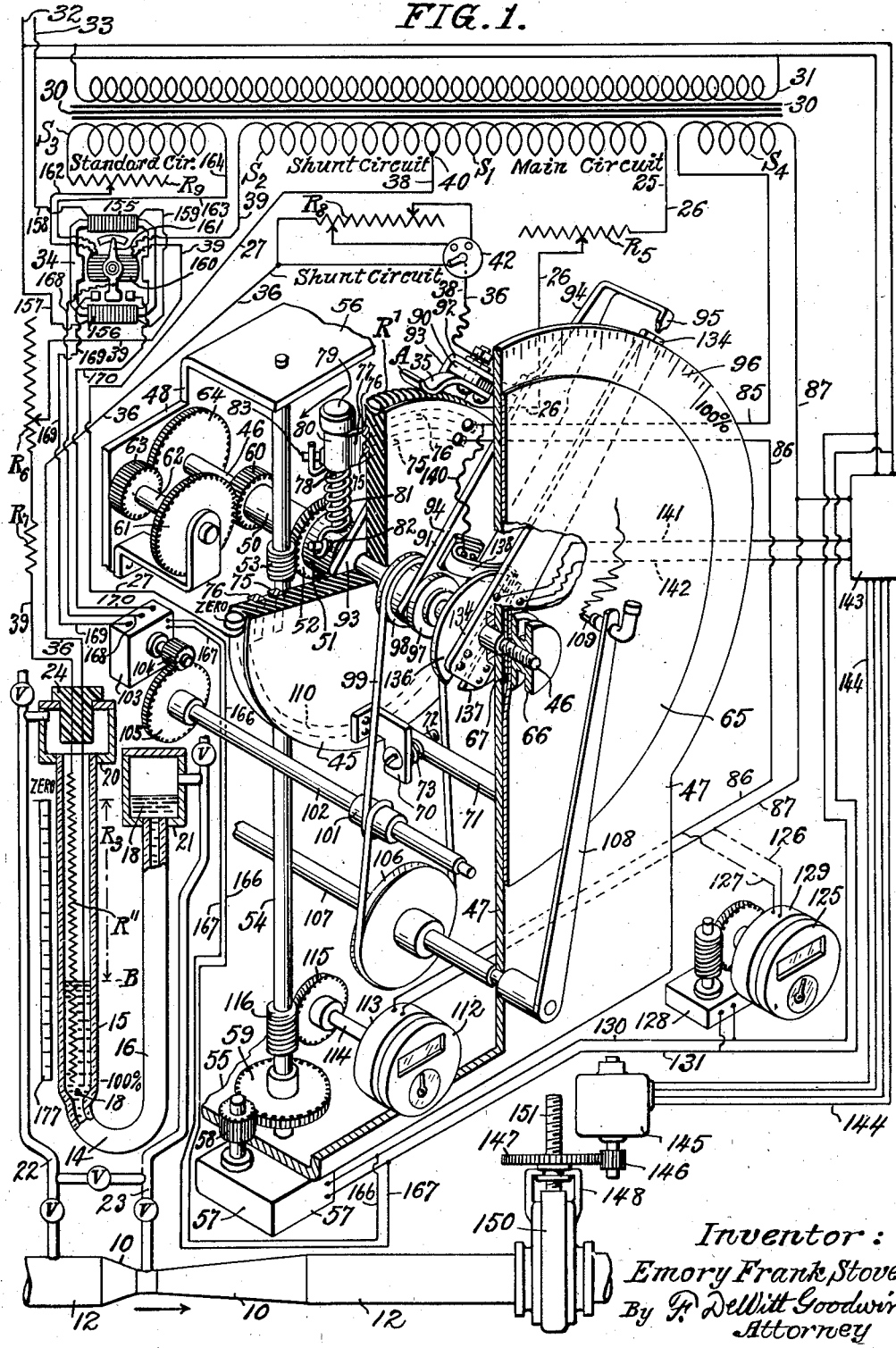
Fig. 1 is a perspective view of my novel meter, showing the electrical circuits diagrammatically.

The meter shown in Figs. 1 to 4, will be first described so that the system of controlling the circuits can be better understood.

A primary metering device, in the form of a Venturi tube 10, is connected in a conduit 12, through which fluid flowing in the direction of the arrow is to be measured. A manometer 14, in the form of a U-tube, having a high pressure member 15 and a low pressure member 16, is provided. The members 15 and 16 contain mercury 18. Reservoirs 20 and 21 are mounted upon the open ends of the members 15 and 16, and are connected by pipes 22 and 23 with the high and low pressure sides of the Venturi tube 10, for subjecting the mercury to the differential pressure produced by the Venturi tube, which pressure is proportional to the square of the rate of flow through the conduit 12.

The reservoir 20 has a plug 24, of insulation material, through which passes a conductor of an electric circuit, such as shown in Figs. 1 and 7. A main circuit 25 includes a resistor R' and conductors 26 and 27. In Figs. 5 to 7 a battery 28 is shown as a source of direct current.

The main circuit may be adapted for alternating current by employing a transformer 30, as shown in Fig. 1, having a primary coil 31, connected with line wires 32 and 33, from a source of supply. The main circuit 25 is shown in Fig. 1 connected with the secondary coil $S_1$ of the transformer.

A contact plate 35 is movably mounted upon the resistor R' and forms a movable contact A, which is connected by a conductor 36, forming part of a shunt circuit 38. The conductor 36 extends through the plug 24 and into the mercury in the U-tube, and makes contact with the mercury.

A resistor R" is located in the member 15 of the U-tube and extends a maximum length into the mercury. The resistor R" is connected with a conductor 39, included in the shunt circuit. Said conductor 39 extends through the plug 24, and is connected with a moving coil of a galvanometer 34, and also to the secondary $S_2$, having a junction 40 with the main circuit 25.

The secondary $S_2$ is included in the shunt circuit 38 to provide sufficient voltage to overcome the resistance of the conductors, and various parts included in the shunt and main circuits, except the resistance of the resistor R' and the resistor R" between the zero and the level of the mercury.

In Figs. 6 and 7 a battery 37 is shown included in the shunt circuit for overcoming the resistance of the conductors, and takes the place of the secondary coil $S_2$, shown in Fig. 1. The shunt circuit, shown in Figs. 6 and 7, has a junction 41 with the main circuit 25.

Fig. 1 shows an adjustable resistor $R_5$ included in the main circuit 25 adapted for changing the range of the meter to accommodate different maximum values of differential pressure, but keeping the same travel of a pointer which is movable with the contact A. The adjustable resistor $R_5$ is connected in series with the resistor R' and is adapted for accommodating different maximum values of the second resistor R'', requiring a change in the resistance of the resistor R' for keeping it at the same value.

The shunt circuit 38 includes an adjustable resistor $R_6$ adapted for adjusting the meter to different resistances of conductors between the manometer and the meter. The resistor $R_7$ is a fixed resistance with negative temperature coefficient adapted for correcting line resistance for temperature changes.

A calibrated resistor $R_8$ is adapted to be utilized as a means of checking the setting of the meter by being substituted in the shunt circuit for the resistance which the resistor R'' would have if certain differential pressures were applied to the manometer. A switch 42 is provided for including the resistor $R_8$ in the shunt circuit.

An adjustable resistor $R_9$ is included in the standard circuit for adjusting the resistance of the conductors of the standard circuit, hereinafter described.

The surface level of the mercury in the tube 15 forms a movable contact B upon the resistor R'' and closes the shunt circuit between the resistor R'' and the portion of the conductor 36 extending into the mercury in the tube 15.

The contacts A and B are shown in Figs. 5 and 6 in the form of sliding contact devices 43 and 44 adapted to be operated manually in contact with the resistors R' and R'', for carrying out the system of controlling the circuits, as more fully hereinafter described.

Referring to Figs. 1 to 4, when there is no flow through the conduit 12 the mercury will stand at the zero level in the tube 15. When there is any flow through the conduit 12 the differential pressure depresses the mercury to a level, or point of contact B, at which point the shunt circuit 38 is closed where the resistor R'' enters the mercury. The portion $R_3$, of the resistor R'' lying between the zero and the mercury contact B, will be directly proportional to the differential pressure from the Venturi tube 10. Resistor R'' is of uniform resistance throughout its length, therefore the resistance of the portion $R_3$ of the resistor will be directly proportional to the quantity to be measured, such as the differential pressure.

In the form shown in Figs. 1 to 4, of the meter, the resistor R' is in the form of a helix of uniform resistance throughout its length. The resistor R' is secured upon the periphery of a disk 45, of insulation material.

A horizontal shaft 46 passes freely through the axis of the disk 45 and supports the latter. The contact plate 35, forming the contact A, is in sliding contact with the resistor R' and is adapted for varying the resistance, as will be later described.

The shaft 46 is rotatably mounted upon the front and back plates 47 and 48. Loosely mounted upon the shaft 46 is a sleeve 50, having secured thereon a hub 51 and a worm wheel 52, which latter meshes with a worm 53, secured upon a vertical shaft 54, rotatably mounted in a base plate 55 and a top plate 56. The shaft 54 is continuously rotated by a synchronous motor 57, through reduction gears 58 and 59. Said sleeve 50 also has secured thereon a gear 60, which meshes with a larger gear 61, secured on a counter shaft 62, having secured thereon a smaller gear 63 which meshes with a gear 64 secured on the shaft 46 and continuously rotates the latter at a slower speed.

A paper chart 65 is positioned for rotation in front of the front plate 47 and is secured to the shaft 46 by a thumb nut 66 and a washer 67 in the usual manner.

The disk 45 is held against rotation on the shaft 46 by a bracket 70, secured upon the disk, and a bar 71, secured in the front and back plates 47 and 48. An adjusting screw 72 is threaded through the bar 71. The bracket 70 is positioned between the head of the screw and a spring 73, which latter is interposed between the bracket and the bar 71. By turning the screw 72 the angular position of the disk may be adjusted.

The disk 45 has two circular contact strips 75 and 76 secured upon its rear face, as shown in Figs. 2 and 3. A swinging contact plate 77 is adapted for closing a circuit by making contact with said strips. Said strips 75 and 76 are arranged in parallel relation to each other and extend through arcs corresponding to the length of the resistor R'.

The swinging plate 77 is mounted upon a radial rod 78, which is secured in said hub 51, secured upon the sleeve 50. The hub 51 is formed of insulation material. The rod 78 is provided with a head 79. The swinging plate 77 has a tubular portion 80 which is rotatably and slidably mounted upon the rod 78. A coiled spring 81 is mounted upon the rod 78 and has one end thereof secured upon a pin 82 on the hub 51 and its opposite end in engagement with a pin 83 secured on the portion 80 of the contact plate 77. The spring 81 tends to slide the contact plate 77 outwardly against the head 79 and also tends to hold the free end of the contact plate against said strips 75 and 76 on the disk, for opening and closing a circuit including conductors 85, 86 and 87, and including the secondary coil $S_4$ as a source of potential.

The contact A, or plate 35, which is in sliding engagement with the resistor R', is mounted upon a block 90, of insulation material. Said block is mounted upon a frame 91, comprising a cross plate 92, secured between arms 93 and 94, which arms are loosely mounted for rotation upon the shaft 46. The arm 94 extends beyond the circular portion of the front plate 47 and carries a pointer 95 adapted to be moved relatively to a dial having a graduated scale 96, upon said front plate.

The arm 94 is secured upon a sleeve 97, freely rotatable upon the shaft 46. Secured to said sleeve 97 is a pulley 98 over which passes a cable 99, driven by a drum 101 secured upon a shaft 102 mounted for rotation upon the front and back plates 47 and 48. The shaft 102 is rotated in either direction by a standard type reversing shaded pole motor 103 through gears 104 and 105.

The cable 99 embraces a pulley 106 secured on a shaft 107, which shaft is mounted for rotation upon the plates 47 and 48. The shaft 107 extends through the front plate 47 and has secured thereon a pen arm 108, carrying a pen 109, adapted for marking upon the chart 65.

The arm 93 of the frame 91 is positioned upon the shaft 46 between the disk 45 and the hub 51, so that the trailing edge of the swinging plate 77 will pass over said arm 93 as the plate 77 is continuously rotated in the direction of the arrow, Fig. 1.

After the plate 77 has passed over and beyond the arm 93 it is urged by the spring 81 against the strips 75 and 76, for completing the circuit including the conductors 85 and 86. When the plate 77 passes beyond the ends of the strips 75 and 76 it opens said circuit, and said plate is pressed against the face of the disk 45 by the torsion action of the spring 81.

An eccentric track, or rail, 110 is secured upon the rear face of the disk 45, and the outer edge of the swinging plate 77 rides upon the inner surface of the rail 110, and the eccentric inner surface of the rail causes the plate 77 to slide upon the radial rod 78, toward the axis of the disk, and against the compression action of the spring 81. The eccentric rail 110 directs the contact plate 77, in its rotation over the disk, so that when the plate 77 leaves the end of the rail 110 it will be held against outward movement upon the rod 78 by the inner cylindrical surface of the strip 75, and the spring 81 will still be compressed. The contact plate 77 will thus be held out of contact with the outer strip 76, until the trailing edge of the plate 77 passes over the arm 93, and said plate is rotated by said arm 93 about the radial rod 78, against the torsion action of the spring 81.

When the contact plate 77 is thus released from said inner cylindrical surface of the strip 75, the spring 81 pushes said plate 77 outwardly upon the rod 78 until it takes against the head 79. The further rotation of the rod 78, about the axis of the shaft 46, causes said plate 77 to pass off the arm 93, and said plate 77 then drops upon and makes contact with the two strips 75 and 76, thus completing the circuit including the conductors 85 and 86.

When the pointer 95 is at the zero point of the scale 96 the arm 93 will be in the position indicated by the dotted line marked zero in Fig. 3, so that the swinging contact plate 77 will not engage the two strips 75 and 76, during any part of the revolution of said plate 77, about the axis of the shaft 46. When the arm 93 is at the zero position the contact plate 77 will not be released from the strip 75, by the arm 93, until the plate 77 has passed beyond the ends of the strips 75 and 76.

When there is fluid passing through the conduit 12 the arm 93 will be rotated, as hereinafter more fully explained, to a position at the left hand side of the zero line shown in Fig. 3, and thus the arm 93 will release the plate 77 and allow it to engage the strips 75 and 76 and complete the circuit between said strips for a period of time during a fraction of the revolution of the contact plate 77, corresponding to the quantity of fluid passing through the conduit 12.

An integrating device, or totalizing device, 112 is provided for showing the total flow of fluid through the conduit 12. The device 112 includes any well known form of magnetic clutch operated indicator. A magnetic clutch 113 is rotated continuously by a shaft 114, driven by a worm wheel 115, secured on the shaft 114 and meshing with a worm 116.

The worm 116 is secured upon the vertical shaft 54, which is continuously rotated by the motor 57. The clutch 113, as shown in Fig. 2, comprises arms 117, secured on the shaft 114. Upon the arms 117 are friction pads 118 which are adapted to engage and rotate a disk 120, secured to a shaft 121 of the integrating, or counting device 112. The disk 120 is moved into frictional engagement with the pads 118 by the coils 122 and 123, which coils magnetize the casing 124 when the circuit including the conductors 85, 86 and 87, is closed by the swinging contact plate 77 closing the circuit between the strips 75 and 76.

An integrating, or counting device 125, similar to the device 112, is provided at a distant location from the meter, and is adapted to be operated by extension conductors 126 and 127 controlling the circuit for operating the device 112.

A separate motor 128 is provided for operating the clutch 129, of the integrating device 125. The motors 57 and 128 are shown connected by conductors 130 and 131, which are connected with the line wires 32 and 33, for continuously rotating the motors 57 and 128.

An adjustable member in the form of an arm 134, of insulation material is mounted for rotation upon the horizontal shaft 46. The arm 134 may be set in different radial positions by hand and it is held against accidental rotation by a spring 135, shown in Fig. 2. Said spring is in frictional engagement with the rear surface of the front plate 47. Semicircular metal contact plates 136 and 137 are secured upon said member, or arm 134. A spring contact plate 138 is carried by the arm 94 of the frame 91.

Said contact plate 138 is adapted to make contact with the plate 136 for completing a circuit including the conductors 85, 140 and 141, or for making contact with the plate 137 for completing a circuit including conductors 85, 140 and 142 for operating a reversing relay 143, which in turn is connected by suitable conductors 144, and adapted for controling a reversing motor 145, having a pinion 146 meshing with a gear wheel 147. Said gear wheel 147 is rotatably mounted upon a bearing 148 upon the housing of a valve 150 adapted for regulating the flow of fluid through the conduit 12. The valve stem 151 is provided with a threaded portion which is in engagement with the threaded aperture of the hub of the gear wheel 147 and is adapted for opening and closing the valve 150 by the reversing motor 145.

The auxiliary pointer arm 134 provides means for controlling the flow through the conduit 12, which flow is to be measured by the meter. Should the flow vary from the desired quantity indicated by the set position of the control pointer arm 134, the pointer arm 94 will move and cause the contact plate 138 to engage either the contact plate 136 or the contact plate 137, and thus control the circuits through the reversing relay 143, for opening or closing the valve 150, until the flow through the conduit 12 is restored to the set reading. Thus the pointer arm 134 may be set for fifty percent of the maximum flow and if the rate of flow departs from that value, for any reason the valve 150 will be regulated to restore the set rate. When the set rate is restored the contact plate 138 will be positioned between the two contact plates 136 and 137 and open the circuits including the relay 143.

The galvanometer 34, shown in Fig. 1, includes field coils 155 and 156, which are energized through the conductors 157, 158 and 159, which are connected with the line wires 32 and 33. The movable coil 160 is secured upon a shaft carrying an arm 161, having a pointer thereon. Said coil 160 has two windings, one of which is connected in the shunt circuit 38, by the conductors 39, and having the secondary $S_2$ as a source of potential. The other winding upon the movable coil 160 is energized, through conductors 162 and 163, by the standard circuit 164 including the secondary $S_3$.

The secondary $S_3$ supplies a current of standard value for moving the coil 160 in the opposite direction from the action of the current of the shunt circuit 38. The shunt circuit 38 has a junction 40 between the secondary $S_2$ of the shunt circuit and the secondary $S_1$ of the main circuit. It will be understood that the secondary $S_2$ is included in the shunt circuit 38 for overcoming the resistance of the contacts, conductors and of the galvanometer 34, but not the resistance of the resistors $R'$ and $R''$.

The adjustable resistor $R_9$ which is included in the standard circuit 164, provides means for varying the current of the standard circuit to any desired standard.

The galvanometer 34, connected in the above manner, provides a means for comparing the deflection produced by the current through the shunt circuit with the deflection produced by a standard current, the latter current having a value which is a fixed proportion of the potential of the main circuit 25 divided by the resistance of the entire resistors $R'$ and $R_5$. Current through the shunt circuit is subjected to the resistance of the portion of the resistor $R''$ between the zero point and the level of the mercury, which is proportional in resistance to the differential pressure, or to a quantity to be measured.

The current of the shunt circuit 38 is further regulated by changing the position of the contact A upon the first resistor $R'$ until sufficient current is carried off from the main circuit through the contact A and through the shunt to balance the galvanometer between the shunt and standard circuits. When the galvanometer is so balanced the length of the portion of the resistor $R'$, between the zero end thereof and the contact A, will form a first branch circuit which is proportional in resistance to the square root of the resistance of the second branch, or shunt circuit, controlled by the portion of the resistor $R''$ between the zero end thereof and the contact B, or level of the mercury.

The position of the contact A, relatively to the length of the resistor $R'$, will indicate a value directly proportional to the flow through the conduit 12, and the pointer 95, which moves with the contact A, will indicate a reading upon the dial 96 which is directly proportional to the flow through the conduit.

The galvanometer 34 controls circuits for operating the reversing motor 103, which latter in turn moves the contact A relatively to the length of the resistor $R'$, through the medium of the cable 99 and the arm 94. The motor 103 is supplied with current through conductors 166 and 167, connected with the wires 130 and 131, which are connected with the line wires 32 and 33.

The direction of rotation of the motor 103 is controlled by the arm 161 which is actuated by the movable coil of the galvanometer 34. The arm 161 when moved in one direction completes a circuit through conductors 168 and 169 for actuating control means, not shown in the drawings, of the motor 103, for causing it to rotate in one direction, and when the arm 161 is moved in the opposite direction it will complete a circuit through conductors 168 and 170 for causing the motor 103 to rotate in the opposite direction.

The electrical network may be arranged for either alternating or direct current. Figs. 5, 6 and 7 illustrate circuits including a battery 28, as a source of direct current.

A spring controlled galvanometer 165, is shown in Figs. 6 and 7, having a set reading equal in value to the potential $E'$ of the main circuit divided by the entire resistance of the resistor $R'$, with the contact A removed.

Scales 176 and 177, graduated from zero to 100%, proportionally to the resistance of the resistors $R'$ and $R''$, are positioned adjacent to pointers 178 and 179 mounted upon the sliding plates 43 and 44, which form the contacts A and B, respectively.

The galvanometer 165 is adapted for indicating when the contact A is adjusted to a position upon the resistor $R'$ in which the current $I_3$, through the shunt, equals the set reading of the galvanometer.

In carrying out my system the contact B is moved upon the resistor $R''$, as indicated in Fig. 6, to include a portion $R_3$ of the resistor $R''$ having a resistance directly proportional to a quantity to be measured. The contact A is then adjusted upon the resistor $R'$ to a position to carry a sufficient current through the resistance of the portion $R_3$ of the resistor $R''$ to cause the galvanometer to return to and indicate said set reading, whereby the resistance of the portion $R_1$ of the first branch is proportional to the square root of the resistance of the portion $R_3$ of said second resistor $R''$ included in the second branch, and the length of the portion $y_1$ of the scale 176 will be equal to the square root of the length of the portion $y_3$ of the scale 177, thus providing a system of obtaining the square root of the quantity to be measured, as indicated by the position of the contact A, and its pointer, relatively to the length of the scale 176.

My novel system of obtaining a square law by causing a current flowing in a branch of an electric circuit to vary directly as the resistance in that branch, is illustrated in the diagrams Figs. 5, 6 and 7, in which the contact A is shown in the form of a sliding contact plate 43, manually movable throughout the length of the resistor $R'$. This plate 43 corresponds to the mechanically movable contact 35, shown in Fig. 1. The contact B, as shown in Figs. 5 and 6, is in the form of a sliding contact plate 44, manually movable throughout the length of the resistor $R''$. This plate 44 corresponds to the mercury contact B, shown in Fig. 1.

The resistors $R'$ and $R''$ have uniform resistance throughout their lengths. Assuming that $E'$ and $I_2$ are constant, that all the conductors are of heavy wire and of negligible resistance relatively to the resistors $R'$ and $R''$, and that the resistance of $R'$ equals the resistance of $R''$, when the contacts A and B are in the positions shown in Fig. 5, the current $I_1$ through the first branch equals the current $I_3$ through the second branch, since $R'$ equals $R''$, and $E'$ equals $E_3$.

Referring to Fig. 6;

By Kirchoff's law for flow of current in branching circuits:

$I_2$ equals $I_1$ plus $I_3$.

From Ohm's law:

$I_2$ equals $\dfrac{E_2}{R_2}$ · $I_1$ equals $\dfrac{E_1}{R_1}$ · $I_3$ equals $\dfrac{E_2-E_1}{R_3}$ If contacts A and B are moved from the positions shown in Fig. 5 to the positions shown in Fig. 6, the part $R_2$ of $R'$ above A is now carrying the current $I_3$ and also the current $I_1$, hence the voltage drop $R_2$ ($I_3$ plus $I_1$) from 100% to A is greater than before, and since the total drop $E'$ from 100 to zero is still the same, the drop in the branch from A to zero, which equals $E'$ minus (100 to A) will be diminished. Since for the branch A to zero $I_1$ equals $$\frac{E_1}{R_1}$$

$I_1$ will be diminished also.

If this current $I_1$ can be shown to diminish in direct proportion to $R_1$ then from Ohm's law, $E_1$ equals $R_1$ times $I_1$, we can write $E_1$ equals $R_1$ times $MR_1$, where M is a constant. Since $I_1$ varies as $R_1$ or $I_1$ equals $MR_1$ or $E_1$ equals $MR_1^2$ $R_1$ equals $$\frac{1}{\sqrt{M_1}}$$

times the square root of $E_1$.

Since $E_1$ is the necessary voltage to cause the current $I_3$ to flow through $R_3$, and since $I_3$ is constant, then $E_1$ varies as $R_3$, or from the above equation $$R_1 = \frac{1}{\sqrt{M_1}}$$

times the square root of $E_1$, $R_1$ equals $$\frac{1}{\sqrt{M_2}}$$

times the square root of $R_3$.

An increase in the resistance $R_3$ will require an increase in the voltage applied to $R_3$ to maintain the constant current $I_3$. This increased voltage is obtained by moving the contact A toward the high potential end of $R'$. But due to the decreased voltage drop in the portion A to 100%, caused by the constant current $I_3$, more of the original voltage $E'$ is left to drive the current $I_1$ through the resistance $R_1$. As a result the voltage drop across $R_1$ increases more rapidly than $R_1$ increases. It actually increases as the product of $R_1$ and $I_1$.

If the resistor $R'$ has uniform resistance per unit length, this increase in $I_1$ is directly proportional to the increase in $R_1$. Therefore the change in the voltage drop across $R_1$ is proportional to the product of $R_1$ and $I_1$ or its equivalent $MR_1$.

Since the result of multiplying any quantity by itself is a squared term, we have a voltage drop across $R_1$ proportional to the square of $R_1$ and since this voltage drop across $R_1$ is the voltage necessary to send a constant current $I_3$ through $R_3$, this voltage will be directly proportional to $R_3$. But since this voltage is directly proportional to $R_1^2$ we have $R_1^2$ equal to $LR_3$, or $R_1$ equal to the square root of $LR_3$, where L is a constant.

That current $I_1$ varies in direct ratio to $R_1$ can be shown mathematically as follows: The total voltage $E'$ is used up according to the following equation:

$E'$ equals $R_2 I_1$ plus $R_2 I_3$ plus $R_1 I_1$. Since $I_3$ is constant $E'$ equals $I_1$ ($R_2$ plus $R_1$) plus $NR_2$, where N is a constant.

$E'$ equals $I_1 R'$ plus $NR_2$ $$I_1 \text{ equals } \frac{E' - NR_2}{R'}$$

Since $E'$ is constant:

$$I_1 \text{ equals } \frac{N_1 - N(R' - R_1)}{R'} \text{ equals } \frac{N_1}{R'} - \frac{NR'}{R'} \text{ plus } \frac{NR_1}{R'}$$

$$I_1 \text{ equals } N_2 - N \text{ plus } \frac{NR_1}{R'}$$

where $N_2$ equals the ratio of constant $N_1$ over constant $R'$. $I_1$ equals $N_3$ plus $N_4 R_1$.

Thus $I_1$ is shown to be equal to a constant plus a constant times $R_1$ or $I_1$ varies directly with $R_1$.

From Kirchoff's law, above stated, for flow of current in branching circuits:

$I_2$ equals $I_1$ plus $I_3$. (Equation 1)

From Ohm's law:

$$I_2 \text{ equals } \frac{E_2}{R_2} \cdot I_1 \text{ equals } \frac{E_1}{R_1} \cdot I_3 \text{ equals } \frac{E_3}{R_3} \cdot \text{equals } \frac{E_1}{R_1}$$

(Equation 2)

From Equations 1 and 2;

$$\frac{E_2}{R_2} \text{ equals } \frac{E_1}{R_1} \text{ plus } \frac{E_3}{R_3} \text{ equals } \frac{E_1}{R_1} \text{ plus } I_3 = \frac{E_1}{R_1} \text{ plus } I_3$$

Since $E_1$ equals $E_3$.

$E'$ equals $E_1$ plus $E_2$, or $E_2$ equals $E' - E_1$
$R'$ equals $R_2$ plus $R_1$, or $R_2$ equals $R' - R_1$
Therefore, $$\frac{E' - E_1}{R' - R_1} \text{ equals } \frac{E_2}{R_1} \text{ plus } I_3 \text{ equals } \frac{I_3 R_3}{R_1} \text{ plus } I_3$$

(Equation 3)

$E' R_1 - I_3 R_3 R_1$ equals $I_3 R_1 R'$ plus $I_3 R_3 R' - I_3 R_1^2 - I_3 R_3 R_1$ (Equation 4)

Since the second and last terms are equal and of the same sign they cancel.

Dividing through by $I_3$.

$$R_1^2 \text{ equals } R_3 R' - \frac{E' R_1}{I_3} \text{ plus } R_1 R'.$$

By assuming $$\frac{E' R_1}{I_3} \text{ equals } R_1 R' \quad \text{(Equation 5)}$$

the last two terms cancel, leaving; $R_1^2$ equals $R_3 R'$.

$$R_1 \text{ equals } \sqrt{R_3 R'} \quad \text{(Equation 6)}$$

From Equation 5; $R'$ equals $$\frac{E'}{I_3}$$

$$R_1 \text{ equals } \sqrt{\frac{E'}{I_3} R_3} \quad \text{(Equation 7)}$$

If voltage $E^1$ is kept constant, and current $I_3$ is kept constant by a change in the position of contact A for every change in the position of contact B, then the relation between $R_1$ and $R_3$ is:

$$R^1 \text{ equals } K \sqrt{R_3} \quad \text{(Equation 8)}$$

where $K$ is a constant.

If $R_1$ and $R_3$ have uniform resistance per unit length then $$y_1 \text{ equals } K \sqrt{y_3}$$

It only remains then to make $y_3$ on the scale 177, Fig. 6, proportional to the resistance of the resistor $R''$, and $y_1$ proportional to the displacement of the pointer on the scale 176, which indicates the square root of the resistance of the resistor $R''$, to obtain a square law.

The above described system of obtaining a square law is embodied in my novel flow meter, herein disclosed.

The system of obtaining the square root of a differential pressure produced by the flow of fluid through a conduit is illustrated in Fig. 7. The flow through the primary metering device 10 produces a differential pressure upon the mercury within the U-tube, proportional to the square of the flow. The resistor R" of the shunt circuit, and one end of the conductor 36 are immersed in the mercury, which latter closes the shunt circuit at the point where they enter the mercury, and the portion R₃ of the resistor R" above the mercury will include a resistance in the second branch of the shunt circuit which varies directly as the differential pressure applied upon the mercury.

The contact A is moved upon the resistor R' until the galvanometer 165 indicates its set reading and thus shows that the current flowing through the second branch R₃ is equal to the set reading of the galvanometer.

The position of the contact A and the pointer 178 relatively to the length of the scale 176, will indicate the square root of the differential pressure, and a value directly proportional to the flow through the primary device 10.

The operation of the meter shown in Figs. 1 to 4, is as follows: When there is no flow through the conduit 12, the mercury will be at the level indicated by the zero mark of the tube 15 of the manometer, and the resistance of the resistor R" will be removed from the shunt circuit 38, including the conductors 36 and 39, therefore the current will be at maximum, which will cause the winding of the movable coil 160 of the galvanometer, with which coil the conductors 39 are connected, to rotate the arm 161, of the galvanometer, in a direction to close the motor circuit through conductors 168 and 169, for rotating the motor 103 in a direction to swing the arm 93 in an anticlockwise direction and thus slide the movable contact A, or plate 35, to the zero end of the resistor R'.

When the arm 93 is positioned adjacent to the zero end of the resistor R', the swinging contact plate 77, which is mounted on the continuously rotating rod 78, will not make contact with the circular contact strips 75 and 76 on the disk 45, because the swinging plate 77 will be held in a position upon the rod 78 adjacent to the sleeve 51, against the action of the spring 81, by the eccentric rail 110, throughout part of the revolution of the rod 78 and by the inner cylindrical surface of the circular contact strip 75, throughout the remainder of the revolution of the rod 78, except when the plate 77 rides over the arm 93, which arm 93 releases the plate 77 from the contact strip 75 when the plate 77 rides over the arm 93, but as the arm 93 is at the zero position the plate 77 will have passed beyond the ends of the strips 75 and 76, therefore the circuit including the conductors 85 and 86 will remain open between the contact strips 75 and 76, and the magnetic clutches 113 and 120 will not operate the counters 112 and 125. The pen arm 108 will also be moved adjacent to the center of the chart 65 by the motor 103 which drives the cable 99 arranged for rotating the arm 93, the pen arm 108, and the arm 94, carrying the pointer 95, simultaneously.

When there is a flow of fluid through the conduit 12 a differential pressure will be produced by the Venturi tube 10, which pressure varies substantially as the square of the rate of flow.

The pressure responsive device 14, in the form of a mercury differential gage is connected with the Venturi tube 10 so that the deflection of the mercury is directly proportional to the differential pressure, or to the square of the rate of flow.

The depression of the mercury in the tube 15 exposes a portion of the resistor R", so that a portion R₃ of the resistor R", lying between zero and the level of the mercury, referred to as contact B, is included in the second branch included in the shunt circuit.

The inclusion of a portion R₃ of the resistor R" in said second branch will cause a drop in the current I₃ through said second branch, which will now be less than said standard current produced by the secondary coil S₃ and acting upon the galvanometer 34. Said standard current will actuate the movable coil and arm 161, of the galvanometer 34, in a direction to complete a circuit including conductors 168 and 170 and rotate the motor 103 in a direction to rotate the arm 93 and slide the contact A, or plate 35, in a clockwise direction, and also rotate the pointer 95 and the pen arm 108, in a direction opposite to the arrow, shown in Fig. 1.

The motor 103 will be rotated in different directions until the contact A, plate 35, includes a portion R₁ of the resistor R' and said contact A is so positioned upon the resistor R' that the current I₃ through the second branch, included in the shunt circuit, will equal the standard current from the secondary coil S₃ and move the galvanometer parts to a balanced position which will cause the motor 103 to remain at rest and said contact A to remain at rest upon the resistor R', and the pointer 95 will directly indicate the rate of flow upon the rate scale 96.

The pen 109 on the pen arm 108 will also record the flow upon the constantly revolving chart 65.

Any change in the rate of flow through the conduit 12 will produce a change in the differential pressure acting upon the mercury in the tube 15 and any change in the level of the mercury will increase or diminish the value of the resistance of the portion of the resistor R" between the zero and the contact B, and produce a change in the value of the current I₃ through the second branch indicated in the diagram Fig. 7.

The current I₃ controls the galvanometer 34, shown in Fig. 1, which in turn controls the motor 103 for moving the contact A upon the resistor R' until the standard current from the secondary S₃ and the current I₃ are equal, and the motor 103 will come to rest with the contact A located upon the resistor R' in a position in which the resistance R₁ of the first branch is proportional to the square root of the resistance R₃ through the second branch and the position of the contact A and also the arms 93 and the pointer 95, relatively to the length of the resistor R', will be directly proportional to the rate of flow, and the pointer 95 will indicate a reading upon the rate scale directly proportional to the rate of flow. The pen on the arm 108 will record directly the flow through the conduit.

If the line voltage varied and the biasing means of the galvanometer did not vary with it an error would be produced. In this invention the galvanometer 34 is biased by current from a separate winding S₃, on the transformer. Since this current rises and falls with the one being measured the effect of line voltage variations is canceled.

The radial position of the arm 93 controls the circuits for intermittently operating the magnetic clutches 113 and 129 which control the totalizing devices 112 and 125, in the following manner: The motor 57 imparts a continuous rotary motion to the hub 51, carrying the radial rod 78, and also rotates the chart 65 through the reduction gears 60, 61, 63 and 64, which rotate the shaft 46 on which the chart is secured.

The continuously rotating radial rod 78 carries the swinging plate 77 around the rear face of the disk 45, in the direction of the arrows Figs. 1 and 3. The plate 77 as it passes from the ends of the contact strips 75 and 76 is held by the head 79 of the rod 78 at the proper distance from the axis of the hub 51 for causing the trailing edge of the plate 77 to engage the rear face of the disk within the space between the hub and the end of the eccentric rail 110 having the greatest radius. As the rod 78 continues to move the plate 77 the outer edge of the latter will take against the inner surface of the rail 110, which latter slides the plate 77 upon the rod 78 toward the hub 51, against the compression action of the spring 81. As the rod 78 continues to rotate the plate 77 within the rail 110 the latter will direct the plate 77 into engagement with the inner cylindrical surface of the strip 75 as the plate 77 passes from the end of the rail 110 to the strip 75, thus the plate 77 is still held out of contact with the other strip 76. When the rod 78 passes the arm 93 the swinging plate 77 will ride over the arm 93 and thus release the plate 77 from locking engagement with the strip 75. The spring 81 slides the plate 77 upon the rod 78 and against the head 79.

When the rod 78 drags the trailing edge of the plate 77 from the arm 93, the plate 77 will make contact with the two strips 75 and 76 and complete the circuit through the conductors 85 and 86 and energize the clutches 113 and 129, which in turn operate the counters 112 and 125. The strips 75 and 76 terminate at the proper places upon the disk 45 so that the trailing edge of the plate 77 will leave the ends of the strips when the pointer 95 is at the zero end of the rate scale 96, thus the counters 112 and 125 are operating at a constant speed for a period of time proportional to the position of the pointer 95, and arm 93, relatively to the rate scale 96.

The total discharge through the conduit 12 equals the rate of flow multiplied by time, therefore the total time the counters 112 and 125 are operating will register the total discharge.

The rate of flow through the conduit 12 may be maintained at a set rate by the valve 150. The arm 134, forming the auxiliary pointer, is adjusted by hand, relatively to the scale 96, for maintaining the desired flow. If the rate of flow falls below the desired set rate the arms 93 and 94 move anticlockwise, as indicated by the arrows Figs. 1 and 3, and the spring contact plate 138, upon the arm 94, will make contact with the semicircular plate 136, which is secured to the arm 134. A circuit including conductors 85, 140 and 141 will be closed by the engagement of the plates 136 and 138 and the motor 145 will be operated by means of the reversing relay 143 in a direction for opening the valve 150. If the rate of flow increases beyond the set rate the arms 93 and 94 will be moved in a clockwise direction, or opposite to the arrow, and the spring contact plate 138 will make contact with the semi-circular contact plate 137 and complete a circuit through conductors 85, 140 and 142 and operate the motor 145 in a direction for closing the valve 150 and reducing the rate of flow.

By means of the pointer 134 the flow through the conduit 12 may be maintained at any desired percentage of the maximum rate of flow, by manually adjusting the pointer, or arm 134, to any desired position relatively to the rate scale 96.

I claim:

1. A measuring system comprising a main electrical circuit including a source of potential, a first resistor in said circuit, a contact movable upon the first resistor, a shunt circuit including said contact, a second resistor included in said shunt, means for varying the resistance of the second resistor to a value directly proportional to a quantity to be measured, and means included in said shunt adapted to indicate when the contact on the first resistor is adjusted to a position for carrying off a current through said shunt equal to the current flowing in the main circuit, when the contact on the first resistor is at zero, and the position of the contact relatively to the length of the first resistor is proportional to the square root of the value of the resistance of the second resistor included in said shunt.

2. A measuring system comprising a main electrical circuit including a source of potential, a first resistor in said circuit, a contact movable upon the first resistor, a shunt circuit including said contact, a second resistor included in said shunt, means for varying the resistance of the second resistor to a value directly proportional to a quantity to be measured, and a galvanometer included in said shunt adapted to indicate when the contact on the first resistor is adjusted to a position for carrying off a current through said shunt equal to the current flowing in the main circuit before said contact was applied to the first resistor, and the position of the contact relatively to the length of the first resistor is proportional to the square root of the value of the resistance of the second resistor included in said shunt.

3. A measuring system comprising a main electrical circuit including a source of potential, a first resistor in said circuit, a contact movable upon the first resistor, a shunt circuit including said contact, a second resistor included in said shunt, said contact adapted to form a first branch between the zero end of the first resistor and said contact, means adapted for varying the length of the second resistor to form a second branch having a resistance value directly proportional to a quantity to be measured, a galvanometer included in said shunt adapted for indicating when the contact on the first resistor is adjusted to a position for carrying off a current through said second branch equal to the current flowing in the main circuit, before said contact was applied to the first resistor, and the position of said contact from the zero end of the first resistor indicates a resistance value of said first branch which is proportional to the square root of the resistance value of said second branch, and a source of potential included in said shunt adapted for overcoming the resistance of the galvanometer, conductors and contacts, exclusive of said first and second resistors.

4. A measuring system comprising a main electrical circuit including a source of potential, a first resistor in said circuit, a contact movable upon said resistor, a shunt circuit including said contact, a second resistor in said shunt, said contact adapted to form a first branch between the zero end of the first resistor and said contact, means adapted for varying the length of the second resistor to form a second branch having a resistance value directly proportional to a quantity to be measured, a galvanometer included in said shunt and having a set reading corresponding to a value equal to said potential divided by the resistance of the first resistor, said contact adapted to be adjusted to a position upon the first resistor for varying the current in said shunt to the set reading of the galvanometer and the position of said contact from the zero end of the first resistor indicates a resistance value of said first branch which is proportional to the square root of the resistance value of said second branch, and a source of potential included in said shunt adapted for overcoming the resistance of the galvanometer, conductors and contacts, exclusive of said first and second resistors.

5. A measuring system comprising a main electrical circuit including a source of potential, a first resistor in said circuit, a contact movable upon said resistor, a shunt circuit including said contact, a second resistor in said shunt, said contact adapted to form a first branch between the zero end of the first resistor and said contact, means adapted for varying the length of the second resistor to form a second branch having a resistance value directly proportional to a quantity to be measured, a galvanometer included in said shunt, a standard circuit carrying a current which is a fixed proportion of the potential of the main circuit divided by the first resistor and arranged for opposing the deflection of the galvanometer caused by the current in the shunt circuit, said contact adapted to be positioned upon the first resistor for balancing the galvanometer between the standard and shunt circuits and the position of said contact from the zero end of the first resistor indicates a resistance value of said first branch which is proportional to the square root of the resistance value of said second branch, and a source of potential included in said shunt adapted for overcoming the resistance of the galvanometer, conductors and contacts, exclusive of said first and second resistors.

6. A measuring system comprising a main electrical circuit including a source of potential, a first resistor in said circuit, a contact movable upon the first resistor, a shunt circuit including said contact, a second resistor included in said shunt, said contact adapted to form a first branch between the zero end of the first resistor and said contact, means for varying the length of the second resistor to form a second branch having a resistance value directly proportional to a quantity to be measured, a galvanometer included in said shunt adapted for indicating when the contact on the first resistor is adjusted to a position for carrying off a current through said second branch equal to the current flowing in the main circuit before said contact was applied to the first resistor, and a scale graduated proportionally to the length of the first resistor and located adjacent to the latter upon which scale the position of said contact indicates a resistance value of said first branch which is proportional to the square root of the resistance included in said second branch.

7. A measuring system comprising a main electrical circuit including a source of potential, a first resistor in said circuit, a contact movable upon the first resistor, a shunt circuit including said contact, a second resistor included in said shunt, means for varying the resistance of the second resistor to a value directly proportional to a quantity to be measured, means controlled by the current flowing through said shunt and opposed by a bias of such value as to balance said means when said current has a value equal to the potential of the main circuit divided by the first resistor, and adjusting means actuated by the second named means and adapted for adjusting the contact upon the first resistor to a position for maintaining said current through said shunt, whereby the position of the contact relatively to the length of the first resistor is proportional to the square root of the value of the resistance of the second resistor included in said shunt.

8. A measuring system comprising a main electrical circuit including a source of potential, a first resistor in said circuit, a contact movable upon the first resistor, a shunt circuit including said contact, a second resistor included in said shunt, said contact adapted to form a first branch between the zero end of the first resistor and said contact, means adapted for varying the length of the second resistor to form a branch having a resistance value directly proportional to a quantity to be measured, a standard circuit having a potential proportional to the potential of said main circuit, and means actuated by the unbalancing of said shunt and standard circuits adapted for moving the contact upon the first resistor to a position to restore a balance between said shunt and standard circuits, whereby the position of said contact from the zero end of the first resistor indicates a resistance value of the first branch which is proportional to the square root of the resistance value of said second branch.

9. A measuring system comprising a main electrical circuit including a source of potential, a first resistor in said circuit, a contact movable upon the first resistor, a shunt circuit including said contact, a second resistor included in said shunt, said contact adapted to form a first branch between the zero end of the first resistor and said contact, means adapted for varying the length of the second resistor to form a branch having a resistance value directly proportional to a quantity to be measured, a standard circuit having a potential proportional to the potential of said main circuit, a galvanometer actuated by the unbalancing of said shunt and standard circuits, and means controlled by the galvanometer adapted for moving the contact upon the first resistor to a position to restore a balance between said shunt and standard circuits, whereby the position of said contact from the zero end of the first resistor indicates a resistance value of the first branch which is proportional to the square root of the resistance value of said second branch.

10. A measuring system as claimed in claim 9 having an adjustable resistor included in the main circuit and in series with the first resistor and adapted for changing the resistance of the first resistor for accommodating different maximum values of said second resistor.

11. A measuring system comprising a main electrical circuit including a source of potential, a first resistor in said circuit, a contact movable upon the first resistor, a shunt circuit including said contact, a second resistor included in said shunt, means for varying the resistance of the second resistor to a value directly proportional to a quantity to be measured, means controlled by the current flowing through said shunt and opposed by a bias of such value as to balance said means when said current has a value equal to the potential of the main circuit divided by the first resistor, and a reversible motor controlled by the last mentioned means and adapted for moving said contact upon the first resistor to a position for maintaining said current through the shunt.

12. A measuring system comprising a main electrical circuit including a source of potential, a first resistor in said circuit, a contact movable upon the first resistor, a shunt circuit including said contact, a second resistor included in said shunt, said contact adapted to form a first branch between the zero end of the first resistor and said contact, means adapted for varying the length of the second resistor to form a branch having a resistance value directly proportional to a quantity to be measured, a standard circuit having a potential proportional to the potential of said main circuit, means actuated by the unbalancing of said shunt and standard circuits, and a reversing motor controlled by the last mentioned means and adapted for moving the contact upon the first resistor to a position to restore a balance between said shunt and standard circuits, and the position of said contact from the zero end of the first resistor indicates a resistance value of the first branch which is proportional to the square root of the resistance value of said second branch.

13. A measuring system comprising a main electrical circuit including a source of potential, a first resistor in said circuit, a first contact movably mounted upon the first resistor, a shunt circuit, a galvanometer in said shunt and having a set reading corresponding to a current equal to said potential divided by the resistance of the first resistor, a second resistor in said shunt, a second contact adapted for varying the resistance of the second resistor to a value directly proportional to a quantity to be measured, a conductor connected between said contacts and included in said shunt, a reversible motor, a motor circuit including the motor and a source of potential, means actuated by the galvanometer adapted for controlling the motor circuit for directing the rotation of the motor, and means actuated by the motor and operatively associated with said first contact for adjusting the latter upon the first resistor to a position in which the current in said shunt is of the same value as said set reading, and the position of the first contact upon the first resistor will indicate a value of the first resistance which is proportional to the square root of the value of the portion of the second resistance included in the shunt circuit.

14. A meter comprising a shaft, a stationary disk positioned on the shaft, an arm mounted for rotation about the shaft and positioned adjacent to the disk, a main electrical circuit including a source of potential, a first resistor mounted upon the periphery of the disk and included in said circuit, a contact plate mounted upon the arm and in sliding contact with said resistor, a shunt circuit including said plate, a second resistor included in said shunt, contact means included in said shunt and adapted for varying the resistance of the second resistor, a reversible motor adapted for moving the arm relatively to the first resistor, and means controlled by the variation of the current in said shunt from a fixed value equal to said potential divided by the resistance of the first resistor and adapted for rotating the motor in a direction for moving the arm and adjusting the contact plate upon the first resistor for restoring the current through said shunt circuit to said fixed value.

15. A meter comprising a shaft, a stationary disk positioned on the shaft, an arm mounted for rotation about the shaft and positioned adjacent to the disk, a main electrical circuit including a source of potential, a first resistor mounted upon the periphery of the disk and included in said circuit, a contact plate mounted upon the arm and in sliding contact with said resistor, a shunt circuit including said plate, a second resistor included in said shunt, contact means included in said shunt and adapted for varying the resistance of the second resistor, a reversible motor adapted for moving the arm relatively to the first resistor, means controlled by the variation of the current in said shunt from a fixed value equal to said potential divided by the resistance of the first resistor, and adapted for rotating the motor in a direction for moving the arm and adjusting the contact plate upon the first resistor for restoring the current through said shunt circuit to said fixed value, a fixed support positioned adjacent to the disk, and adjusting means associated with the disk and said support adapted for adjusting the angular position of the disk.

16. A meter comprising a shaft, a disk positioned on the shaft, an arm mounted for rotation about the shaft and positioned adjacent to the disk, a main electrical circuit including a source of potential, a first resistor mounted upon the periphery of the disk and included in said circuit, a contact plate mounted upon the arm and in sliding contact with said resistor, a shunt circuit including said plate, a second resistor included in said shunt, contact means included in said shunt and adapted for varying the resistance of the second resistor, a reversible motor adapted for moving the arm relatively to the first resistor, means controlled by the variation of the current in said shunt from a fixed value equal to said potential divided by the resistance of the first resistor and adapted for rotating the motor in a direction for moving the arm and adjusting the contact plate upon the first resistor for restoring the current through said shunt circuit to said fixed value, a dial having a scale thereon and graduated proportionally to the length of the first resistor, means mounting the dial in a fixed position adjacent to the arm, and a pointer mounted for movement with said arm and located adjacent to the said scale.

17. A meter comprising a main electrical circuit including a source of potential, a first resistor in said circuit, a shunt circuit, a second resistor in said shunt, means adapted for varying the resistance of the second resistor to a value directly proportional to the square of a quantity to be measured, a contact movable upon the first resistor and included in said shunt, a galvanometer controlled by the current flowing through the shunt and opposed by a bias of such value as to balance said galvanometer when said current has a value equal to the potential of the main circuit divided by the first resistor and a reversible motor controlled by the galvanometer and adapted for moving said contact upon the first resistor to a position for maintaining said current through the shunt to said value of the potential of the main circuit divided by the first resistor.

18. A meter comprising a main electrical circuit including a source of potential, a first resistor in said circuit, a shunt circuit, a second resistor in said shunt, means adapted for varying the resistance of the second resistor to a value directly proportional to the square of a quantity to be measured, a contact movable upon the first resistor and included in said shunt, a third circuit including a source of potential and having a standard current, a galvanometer biased by said standard current and adapted for comparing said current with the current in the shunt circuit, and said contact adapted to be adjusted upon the first resistor for varying the current in said shunt to a value proportional to said standard current, and indicating means actuated by said contact adapted for indicating a value of the first resistance proportional to the square root of the value of the portion of said second resistance which is included in the shunt circuit.

19. A meter comprising a shaft, a stationary disk positioned upon the shaft, a main electrical circuit including a source of potential, a first resistor included in said circuit, means mounting said resistor upon a segmental portion of the periphery of the disk, an arm loosely mounted for rotation about said shaft, a contact plate mounted upon the arm and movable in contact with said resistor, a shunt circuit including said contact, a second resistor included in said shunt, means adapted for varying the resistance value of the second resistor, a third circuit having a standard current, a galvanometer biased by said standard current and balanced by the current in said shunt, a reversible motor adapted for rotating said arm, and means actuated by the galvanometer adapted for controlling the direction of rotation of the motor for adjusting said contact carried by the arm to a position upon the first resistor in which the current through said shunt will balance said standard current and the radial position of the arm carrying said contact will indicate a resistance value of the first resistor which is proportional to the square root of the resistance value of the second resistor.

20. A meter comprising a main electrical circuit, a first resistor in said circuit, a contact movable upon the first resistor, a shunt circuit including said contact, a second resistor included in said shunt, said contact adapted to form a first branch between the zero end of the first resistor and said contact, means adapted for varying the length of the second resistor to form a second branch having a resistance value directly proportional to a quantity, a galvanometer included in said shunt and actuated in one direction by the current in said shunt against a bias of such value as to balance the galvanometer when said current has a value equal to the potential of the main circuit divided by the first resistor, and a reversible motor controlled by the galvanometer and adapted for adjusting said contact upon the first resistor for maintaining the galvanometer in balance and the resistance of the portion of the first resistor included in the first branch proportional to the square root of the resistance of the portion of the second resistor included in the second branch.

21. A meter as claimed in claim 20 having a scale graduated proportionally to the length of the first resistor, and a pointer located adjacent to the scale and movable in unison with the contact upon the first resistor.

EMORY FRANK STOVER.